(12) United States Patent
Monvoisin et al.

(10) Patent No.: US 10,006,781 B2
(45) Date of Patent: Jun. 26, 2018

(54) METHOD FOR AUTOMATICALLY ADAPTING THE RANGE OF VISIBILITY IN A THREE-DIMENSIONAL SYNTHETIC REPRESENTATION OF THE OUTSIDE LANDSCAPE IN AN ON-BOARD DISPLAY SYSTEM FOR AIRCRAFT

(71) Applicant: THALES, Courbevoie (FR)

(72) Inventors: Emmanuel Monvoisin, Bordeaux (FR); Xavier Servantie, Pessac (FR); Pierre Mariani, Saint Medard en Jalles (FR)

(73) Assignee: THALES, Courbevoie (FR)

( * ) Notice: Subject to any disclaimer, the term of this patent is extended or adjusted under 35 U.S.C. 154(b) by 0 days. days.

(21) Appl. No.: 15/638,218

(22) Filed: Jun. 29, 2017

(65) Prior Publication Data

US 2018/0010922 A1    Jan. 11, 2018

(30) Foreign Application Priority Data

Jul. 7, 2016 (FR) .................................... 16 01059

(51) Int. Cl.
| | |
|---|---|
| G08B 23/00 | (2006.01) |
| G01C 23/00 | (2006.01) |
| G06T 17/05 | (2011.01) |
| G08G 5/00 | (2006.01) |

(52) U.S. Cl.
CPC ............ *G01C 23/005* (2013.01); *G06T 17/05* (2013.01); *G08G 5/0086* (2013.01)

(58) Field of Classification Search
CPC ..... G01C 23/005; G01C 21/005; G01C 21/20
USPC .................................................. 340/970–977
See application file for complete search history.

(56) References Cited

U.S. PATENT DOCUMENTS

| | | | |
|---|---|---|---|
| 6,862,501 B2 | 3/2005 | He | |
| 7,098,913 B1 | 8/2006 | Etherington et al. | |
| 7,262,713 B1 | 8/2007 | Vogl et al. | |
| 7,825,831 B2 * | 11/2010 | Naimer | G01C 23/00 340/970 |
| 8,185,301 B1 * | 5/2012 | Simon | G01C 23/005 340/945 |
| 8,264,498 B1 * | 9/2012 | VanDerKamp | G01C 21/005 340/980 |
| 2010/0026525 A1 * | 2/2010 | Feyereisen | G01O 5/005 340/972 |
| 2014/0214245 A1 | 7/2014 | Baudson et al. | |
| 2016/0282120 A1 * | 9/2016 | Wang | G01C 23/00 |
| 2017/0186406 A1 * | 6/2017 | Frestel | B64D 43/00 |

\* cited by examiner

*Primary Examiner* — Tai T Nguyen
(74) *Attorney, Agent, or Firm* — Baker & Hostetler LLP

(57) ABSTRACT

A method for three-dimensional graphic representation of the outside landscape in an on-board display system for aircraft comprises a graphical computer and a display screen. The graphic representation is computed to a visibility distance. In the method the zero pitch line of the aircraft forms, with the real horizon line, a first angle, the line representing the limit of the visibility distance forming, with the real horizon line, a second angle, in a first step, the graphical computer determines the maximum visibility distance such that the difference between the first angle and the second angle remains less than a determined value; in a second step, the graphical computer determines the visibility distance as a function of the maximum visibility distance, of the maximum altitude of the relief of the local environment and of the flight phase.

5 Claims, 2 Drawing Sheets

METHOD FOR AUTOMATICALLY ADAPTING THE RANGE OF VISIBILITY IN A THREE-DIMENSIONAL SYNTHETIC REPRESENTATION OF THE OUTSIDE LANDSCAPE IN AN ON-BOARD DISPLAY SYSTEM FOR AIRCRAFT

CROSS-REFERENCE TO RELATED APPLICATIONS

This application claims priority to foreign French patent application No. FR 1601059, filed on Jul. 7, 2016, the disclosure of which is incorporated by reference in its entirety.

FIELD OF THE INVENTION

The field of the invention is that of the human-machine interfaces for aeronautical applications, and more particularly that of the synthetic display systems comprising means for displaying a three-dimensional synthetic image of the outside landscape.

BACKGROUND

Modern aircraft generally have a synthetic vision system, referred to by the acronym "SVS". This system makes it possible to present to the crew a synthetic image of the outside landscape generally including piloting or navigation information.

An SVS system comprises a cartographic database representative of the terrain being flow over, a geolocation system, electronic computation means and several display devices located in the cockpit of the aircraft. The geolocation system is of the "GPS" type, GPS being the acronym for "Global Positioning System". It can be coupled with the inertial system of the aircraft. The geolocation system as a whole supplies at least the following parameters: position of the aircraft in attitude, longitude and altitude and orientation of the aircraft in pitch, roll and heading.

Generally, the image is displayed on the display screens which are located on the front panel of the aircraft instrument panel. The image is a three-dimensional view of the outside represented as realistically as possible. The point of view displayed is in the axis of the aircraft. The synthetic image is computed to a certain distance from the aircraft so as to limit the computations necessary to the display. This distance is called "SVS range". In effect, beyond a certain distance, the image of the landscape is of small dimensions. Moreover, it is of little interest for the piloting of the aircraft.

This synthetic image generally comprises a piloting and navigation aid symbology. It conventionally comprises an artificial horizon giving the attitude of the aircraft and indicators giving the altitude and the speed of the aircraft. This symbology also displays a line representing the zero longitudinal pitch indicator, also called "ZPRL", the acronym for "Zero Pitch Reference Line". In an abuse of language, the "ZPRL" is often called "horizon line".

As can be seen in FIG. 1 which represents a view in vertical cross section of an aircraft A flying over a terrain T, the ZPRL forms, with the true horizon line LH, a first angle α. This line forms, with the limit of the cartographic representation RC, a second angle β that is necessarily greater than the first angle. These angles are generally several degrees at high altitude.

FIG. 2 represents the display, on an aircraft display device, of a cartographic representation of the terrain being flown over comprising piloting symbology. This symbology comprises a ZPRL. In this figure, the difference between this ZPRL and the end of the cartographic representation is notable. It has been demonstrated that a significant angular deviation between the SVS range and the ZPRL is very disturbing for the pilots because it does not correspond to the usual visual orders of magnitude. That occurs above all at high altitude, the deviation increasing with the altitude of the aircraft.

Moreover, some aeronautical standards like the standard AC 20-167 entitled "Airworthiness Approval of Enhanced Vision System, Synthetic Vision System, Combined Vision System, and Enhanced Flight Vision System Equipment", require the information provided by the SVS to be correlated with the ZPRL. For example, the terrain which is located above the altitude of the carrier at a given instant must always appear above the ZPRL, if it is close enough to be dangerous.

A first means for resolving these various problems is to display a cartographic representation over longer distances. The defect with this solution is a significant additional requirement in terms of performance of the electronic platform both at the central processor level and at the graphical computation means level to allow the display of the image at the expected frequency and image quality.

A second means consists in simplifying the representation of the terrain as a function of the distance from the terrain to the aircraft. The U.S. Pat. No. 6,862,501 entitled "Method for producing 3D perspective view avionics terrain displays" and the U.S. Pat. No. 7,262,713 entitled "System and method for a safe depiction of terrain, airport and other dimensional data on a perspective flight display with limited bandwidth of data presentation" propose solutions of this type.

SUMMARY OF THE INVENTION

The cartographic representation method according to the invention does not present these drawbacks in as much as it uses a simple criterion to determine the SVS range. More specifically, the subject of the invention is a method for graphically representing a three-dimensional synthetic view of the outside landscape in an on-board display system for aircraft comprising a graphical computer and a display screen, said graphic representation being displayed on said display screen and comprising piloting and/or navigation information of said aircraft superimposed on said three-dimensional synthetic representation of the outside landscape, said synthetic representation being computed to a first determined distance called visibility distance, characterized in that a zero pitch line of the aircraft forming, with a real horizon line, a first angle, a line representing the limit of the visibility distance forming, with the real horizon line, a second angle,
  in a first step of the method, the graphical computer determines a maximum visibility distance such that the difference between the first angle and the second angle remains less than a determined value;
  in a second step of the method, the graphical computer determines the visibility distance as a function of the maximum visibility distance, of the maximum altitude of the relief of the local environment of said aircraft and of the flight phase of said aircraft, said local environment being limited at most to the outside landscape appearing in the three-dimensional synthetic representation displayed.

Advantageously, the determined value of the difference between the first angle and the second angle depends on the altitude of the aircraft.

Advantageously, the determined value of the difference between the first angle and the second angle does not exceed 0.5 degrees.

Advantageously, the local environment of said aircraft is limited by a second determined distance that is a function of the maximum visibility distance.

Advantageously, the determined value of the difference between the first angle and the second angle is modified manually by means of a human-machine interface.

BRIEF DESCRIPTION OF THE DRAWINGS

The invention will be better understood and other advantages will become apparent on reading the following description given in a nonlimiting manner and by virtue of the attached figures in which.

DETAILED DESCRIPTION

The method according to the invention is implemented in a system of SVS type. The latter comprises at least one cartographic database representative of the terrain flown over, a geolocation system, electronic computation means comprising a graphical computer and several display devices located in the cockpit of the aircraft. The method is implemented by the electronic computation means.

As has been seen, a significant angular deviation between the SVS range and the ZPRL is disturbing for the pilots. The method for graphically representing a synthetic view starts from this observation. With the synthetic representation of the landscape being computed to a first determined distance called visibility distance, in a first step of the method, the graphical computer determines the maximum visibility distance such that the angular difference between the first angle and the second angle remains less than a determined value. This angular difference varies with the altitude.

Figure 1:
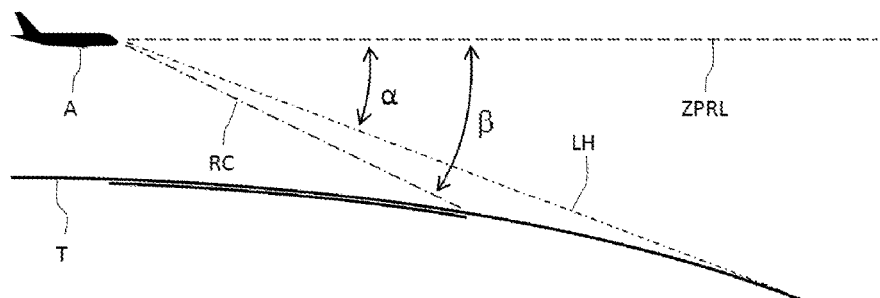
FIG. 1 represents a view in vertical cross section of an aircraft flying over a terrain.
Figure 2:
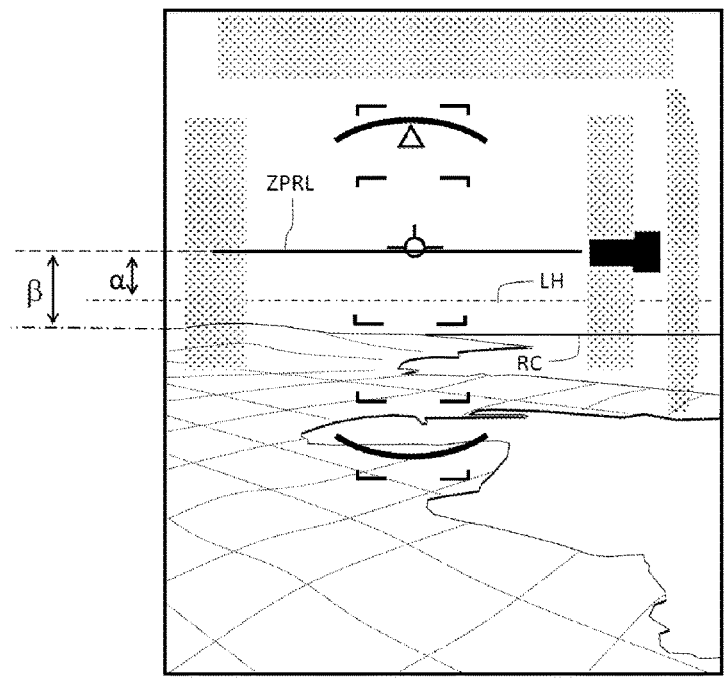
FIG. 2 represents the display, on an aircraft display device, of a cartographic representation of the terrain being flown over comprising a piloting symbology.
Figure 3:
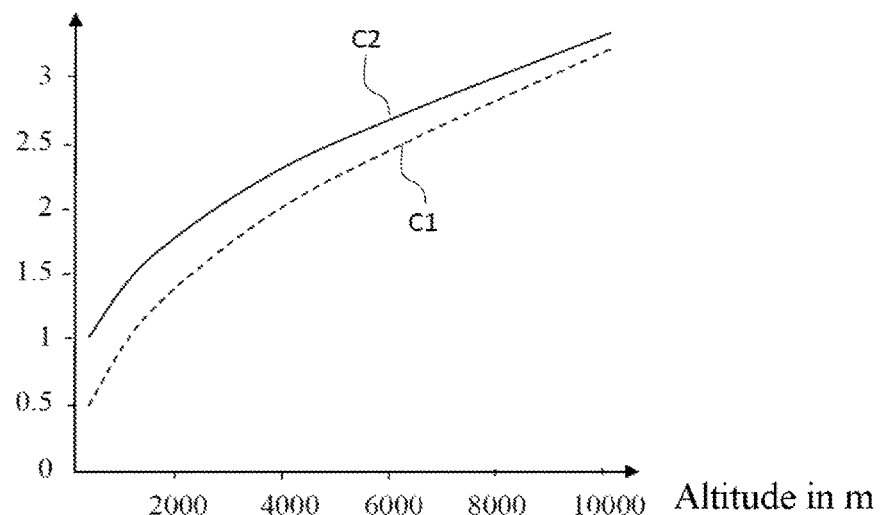
FIG. 3 represents the variations of the angular difference between the ZPRL and the limit of the cartographic representation as a function of the altitude.
Figure 4:
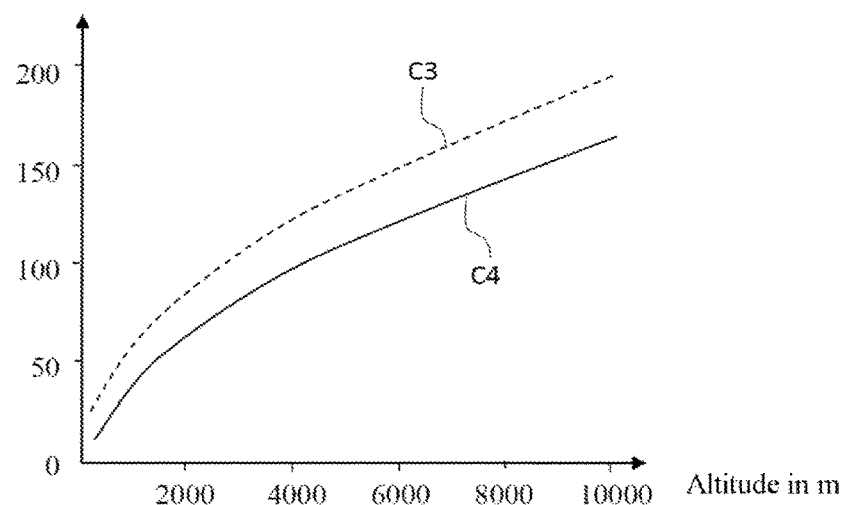
FIG. 4 represents the variations of the visibility limit as a function of the altitude.

The curves of FIGS. 3 and 4 illustrate this first step of the method. In FIG. 3, a first curve C1 in dotted lines represents, as a function of the altitude in meters of the aircraft, the angle that exists between the zero pitch line of the aircraft and the real horizon line. A second curve C2 in a continuous line represents, as a function of the altitude in meters, the angle that exists between the zero pitch line of the aircraft and the maximum visibility distance limit. This angle is chosen such that, whatever the altitude, the difference between the two curves does not exceed a determined value, that is a function of the altitude. This value is chosen to be low enough to be tolerated by the pilots. In FIG. 3, this value is 0.5 degrees when the aircraft is close to the ground. It decreases with the altitude to reach 0.1 degrees at high altitude.

However, this slight difference makes it possible to significantly reduce the maximum visibility distance. Thus, the first curve C3 in dotted lines of FIG. 4 represents, as a function of the altitude of the aircraft, the distance to the real horizon line. The second curve C4 in a continuous line represents, as a function of the altitude, the visibility distance taken into account by the graphical computer. For example, at 1000 meters altitude, an angular deviation of 0.5 degrees between the two curves of FIG. 3 makes it possible to switch from a real horizon line situated at more than 60 nautical miles to a visibility distance of a little more than 20 nautical miles. At 10000 meters altitude, an angular deviation of 0.1 degrees between the two curves of FIG. 3 makes it possible to switch from a real horizon line situated at more than 190 nautical miles to a visibility distance of a little more than 150 nautical miles.

Thus, at the cost of a small increase in the angle that exists between the zero pitch line of the aircraft and the real horizon line, the visibility distance is substantially reduced and, as is, consequently, the graphic representation computation time which is proportional to the square of the visibility distance given identical resolution. Conversely, given equivalent to computation time, it is possible to increase the resolution of the synthetic image if the visibility distance is reduced.

In a second step of the method, the graphical computer determines the visibility distance actually taken into account by the graphical computer as a function of the maximum visibility distance, of the maximum altitude of the relief of the local environment of said aircraft and of the flight phase of said aircraft, said local environment being limited at most to the outside landscape appearing in the three-dimensional synthetic representation displayed.

In effect, if the altitude of the relief represents a significant fraction of the altitude of the aircraft, the visibility distance can be significantly reduced. That amounts to computing the visibility distance no longer in relation to the true altitude of the aircraft, but in relation to its distance to the ground.

If the aircraft is located at an altitude less than the average height of the local relief, then the graphical computer takes account of a minimum visibility distance. Such is the case of an aircraft landing at or taking off from an airport situated in a mountainous region or of a helicopter navigating in the mountains.

In some flight phases, the visibility distance can be imposed so as to increase the resolution of the terrain in the environment of the aircraft.

Finally, the determined value of the difference between the first angle and the second angle can be modified manually by means of a human-machine interface of keyboard or touch surface type, means which are available on the aircraft instrument panels.

The invention claimed is:

1. A method for graphically representing a three-dimensional synthetic representation of an outside landscape in an on-board display system for an aircraft comprising a graphical computer and a display screen, said graphic representation being displayed on said display screen and comprising piloting or navigation information of said aircraft superimposed on said three-dimensional synthetic representation of the outside landscape, said synthetic representation being computed up to a first determined distance being a visibility distance, wherein a zero pitch line of the aircraft forms, with a real horizon line, a first angle, and a line representing a limit of the visibility distance forms, with the zero pitch line, a second angle, wherein in a first step of the method, the graphical computer determines a maximum visibility distance such that a difference between the first angle and the second angle remains less than a determined value; and wherein in a second step of the method, the graphical computer determines a visibility distance as a function of the maximum visibility distance, of a maximum altitude of a relief of a local environment of said aircraft and of a flight phase of said aircraft, said local environment being limited at most to the outside landscape appearing in the three-dimensional synthetic representation displayed.

2. The graphic representation method according to claim 1, wherein the determined value of the difference between the first angle and the second angle depends on an altitude of the aircraft.

3. The graphic representation method according to claim 1, wherein the determined value of the difference between the first angle and the second angle does not exceed 0.5 degrees.

4. The graphic representation method according to claim 1, wherein the local environment of said aircraft is limited by a second determined distance that is a function of the maximum visibility distance.

5. The graphic representation method according to claim 1, wherein the determined value of the difference between the first angle and the second angle is modified manually by means of a human-machine interface.

* * * * *